June 14, 1927.
J. BIJUR
1,632,775
LUBRICATING INSTALLATION
Filed Aug. 31, 1926
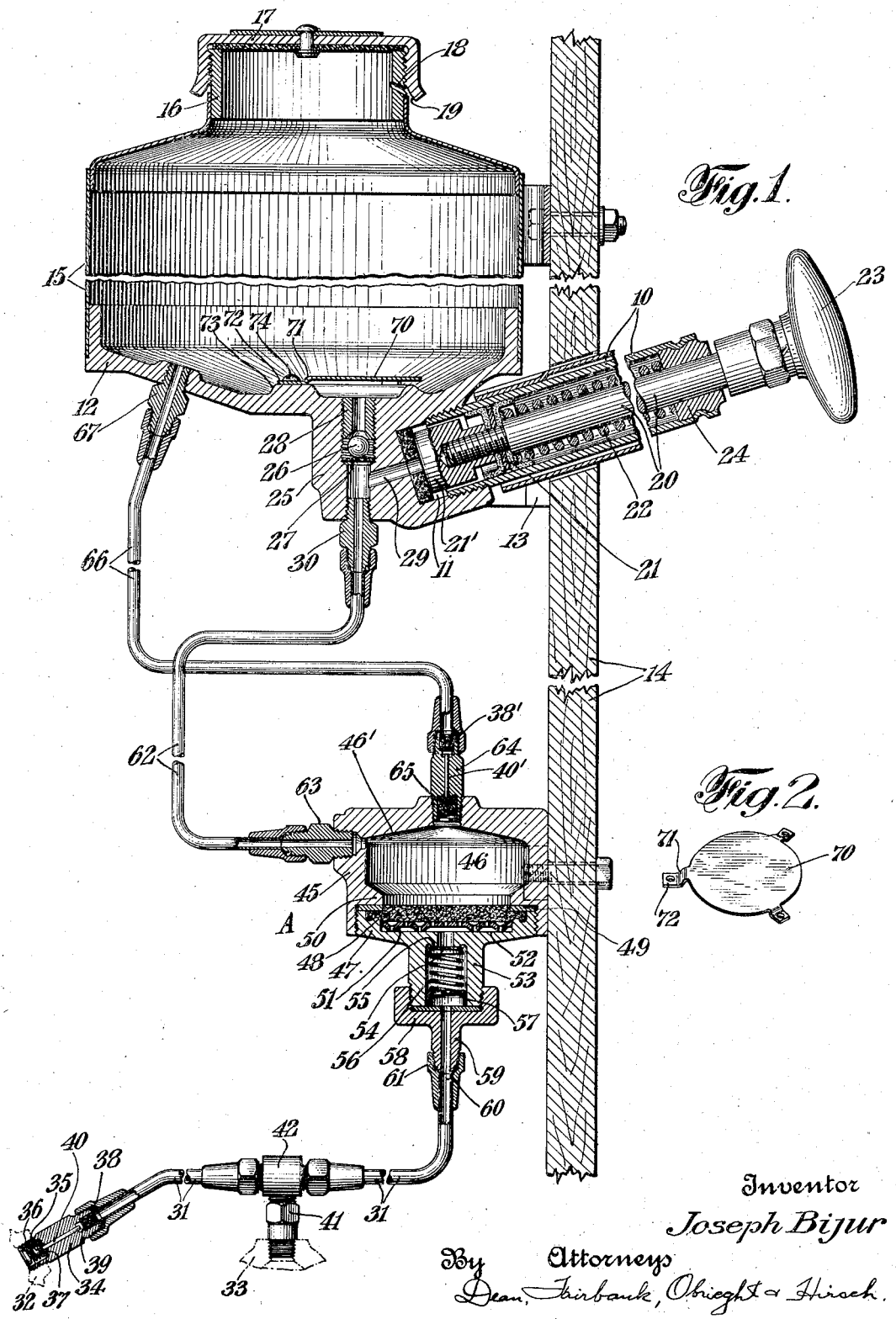
Inventor
Joseph Bijur
By Attorneys
Dean, Fairbank, Chiesght & Hirsch.

Patented June 14, 1927.

1,632,775

UNITED STATES PATENT OFFICE.

JOSEPH BIJUR, OF NEW YORK, N. Y., ASSIGNOR TO AUTO RESEARCH CORPORATION, A CORPORATION OF DELAWARE.

LUBRICATING INSTALLATION.

Application filed August 31, 1926. Serial No. 132,691.

My present invention relates primarily to central pressure lubricating installations of the type, the correct operation of which depends on maintaining filled with the lubricating medium the entire system of piping intervening between the pump and the control devices that govern the distribution to the bearings.

In a system of the type set forth, of character useful more especially in central chassis lubrication it is desirable to provide a pump operated only from time to time and provided with a close fitting or suction piston that will eject the entire pump charge into the pipe system, so that a minimum length of stroke and minimum operating effort are required as distinguished from a pump with a loose operating member or piston, which will permit much of the charge to leak thereby.

Should, however, a pump having the preferred close fitting piston, be operated one or more times in such system, in the absence of a sufficient charge of oil there would be a likelihood of feeding in part at least, air rather than oil, thereby interfering with the operation of a pipe system of the character set forth. The subsequent slow expansion of air thus advanced and compressed into the piping system after completion of one or more pump strokes would bring about irregular and sluggish emission of oil to the bearings and the distribution would not be so accurately determined by the control devices.

It is accordingly an object of the invention to prevent the compression of air into the pipe line even though a lubricating system of the type set forth including the preferred pump set forth, be operated one or more times in the absence of a sufficient supply of lubricant.

Another object is to provide a system of the above type which while disposing of air does not thereby render the system accessible for the entry of dust, dirt, or water into the course of oil flow.

These objects are accomplished in the system of my copending application Serial No. 124,566 filed July 24, 1926, by the reservoir installation there disclosed.

In the present application I have disclosed a less specialized suction pump and reservoir installation, supplying a piping system such as disclosed in my copending application, the disposal of air advanced by the discharge of the suction pump being effected by means exteriorly of the reservoir.

Generically in common with the embodiment disclosed in said copending application, the present invention operates by the provision of an air rejecting construction serving to vent air but sustaining the pressure exerted upon lubricant, so as to render possible the transmission of pressure through the piping system. In common also with the disclosure of said copending application, I provide adjacent the air rejecting means a settling or air separating chamber upon which the pump exerts pressure and from which air readily escapes through the rejecting device during pump operation.

According to the present invention the air rejecting instrumentality is a separate small compact inexpensive unit that may be disposed at any suitable place in the pipe line preferably near the pump and reservoir.

Reservoir constructions of certain types might tend to drain through the air rejecting unit, if one or more of the flow controlling outlets of the pipe system should be leaky. To obviate such loss, the air rejecting unit is preferably provided with a spring-seated relief valve at its outlet to the pipe system, through which passes all the oil to the bearings.

According to another feature, the air rejecting unit may also be embodied with a filter pad, preferably between the settling chamber and the relief valve, the oil being forced by pressure through said filter to intercept any solid particles therefrom.

The air rejecting unit is preferably sealed to prevent the entry of dust, without, however, interfering with escape of air therefrom. In a preferred embodiment, a conduit or pipe connects the air rejecting device for this purpose to the interior of the vented reservoir.

In the present embodiment, I have employed as the air vent, an open passage of cross-section so minute as to greatly resist the flow of viscous oil therethrough, but to exert no marked retarding action upon air. In a desirable embodiment this air venting device may be a drip plug of the character disclosed in my said copending application with the relief valve element thereof omitted.

The lubricating system is claimed in the present application only in combination with the air rejecting means. Claims to the system as such, not limited to the air rejection feature, are presented in my copending applications, Serial No. 124,566 filed July 24th, 1926, Serial No. 580,668, filed August 9, 1922 and Serial No. 662,195, filed September 12th, 1923, of which the present application is a continuation in part. The reservoir and pump combination and the pump per se have certain features in common with the disclosure in my copending application, Serial No. 131,640 filed Aug. 26, 1926 and in the divisions thereof, Serial No. 182,362, filed April 9th, 1927, and Serial No. 193,090 filed May 21, 1927, in which are presented the generic claims to this subject-matter. The reservoir per se, the air rejecting instrumentality per se and the combination thereof, have certain features in common with the disclosure in my copending application, Serial No. 132,141 filed August 28th, 1926 in which are presented the generic claims to that subject-matter.

In the accompanying drawings in which is shown one of various possible embodiments of the several features of my invention, Fig. 1 is a fragmentary diagrammatic view showing my system, Fig. 2 is a perspective of a detail of the reservoir.

Referring now to the drawings, I have shown a lubricant supply installation including a pump illustratively comprising a cylinder 10 threaded at its inner end into a corresponding socket 11 in the cast bottom 12 of reservoir 15. The bottom 12 is shown secured at 13 to a vertical support 14 such as, for instance, the dashboard of an automobile. The wall 15 of the reservoir is preferably of sheet metal as shown, which encircles and is soldered to the rim of the base. The filling neck 16 of the reservoir is preferably a machined sleeve soldered to the top of the reservoir and having a filling cap 17 threaded thereon. The wall of the neck 16 has an oblique dust excluding venting bore 18 extending downwardly and opening to the air, and overlapped by the outwardly flaring part 19 of the cap 17 which acts as a protection therefor.

The pump is preferably of the tight-fitting piston type and includes a piston rod 20 having the usual leather cups 21 thereon and urged preferably by an encircling coil compression spring 22 to discharging position after a charging operation through a pull on the operating knob 23 which protrudes through the head 24 of the cylinder.

The bottom of the reservoir is formed with a well 25 constituting a valve cage enclosing preferably a ball valve 26 normally resting upon a wire mesh screen 27 and having a seating block 28 thereabove preferably threaded into the upper end of the well. The bottom of the well communicates with the pump cylinder through a port 29 in the reservoir base, opening through the inner end of socket 11. The pump piston has an extension metal seating disk 21' urged by spring 22 to normally close port 29 and prevent escape of lubricant from the reservoir to the pump when the latter is idle. The supply installation has a discharge nipple 30 threaded preferably into the bottom of the reservoir.

The pipe line supplied from the nipple 30 through intervening apparatus to be described below, is preferably of the same character as that shown in my copending application Serial No. 124,566. For simplicity there is shown in a purely diagrammatic manner a pipe line 31 of bore too small to permit flow of lubricant about any air therein, and provided with flow controlling outlet fittings which may be applied directly at the bearings, two of which are shown at 32 and 33. It may be briefly noted that the outlet at an end of a pipe line comprises a drip plug 34 having preferably a valve 35 urged by spring 36 against its seat 37 at the outlet end, a felt plug 38 backed by an appropriate screen 39 fitting in a corresponding socket at the inlet end. A flow controlling restriction member is interposed between said valve and said felt, said restriction member being shown as a metal pin 40 extending with minute clearance in a corresponding longitudinal bore and held from dropping out of the fitting by the valve 35 at one end and the strainer 38 at the opposite end. I have also illustratively shown in the run of the line, a drip plug 41 which is substantially identical in construction with that just described but secured at its inlet end to a cross or T bar 42 to the ends of which the corresponding lengths of pipe 31 are secured by appropriate couplings.

The resistance to flow of each drip plug in itself substantially determines the rate of emission substantially regardless of the length or resistance of pipe leading thereto and the restriction determined by the pin in the bore in itself substantially determines the resistance to flow of the drip plug. The drip plugs may have different ratings depending upon the requirements of the various bearings, said ratings being determined solely by the gauge of pin or wire 40 therein. Only two drip plugs are shown, it being understood that a multiplicity of such drip plugs distributed in accordance with the location of the bearings would ordinarily be used at outlet branches such as at 41 and at the ends such as at 34 of a common piping main.

If the system thus far described were operated without further safeguard, in the absence of a sufficient supply of lubricant, in the reservoir, air would be forced by the tight fitting piston into the pipe line and in subsequent strokes would be compressed in the pipe line, thereafter expanding slowly and irregularly to cause prolonged irregular emission through some of the drip plugs, thereby interfering with the accuracy of division inherent in the system when operated under proper conditions. Moreover, the minute strainer plugs 38 at the drip plugs would, in time become seriously clogged with dirt or other solid particles in the oil unless great care were taken to provide only pure oil in the reservoir. Moreover with a reservoir of the type noted, should a drip plug at lower level become leaky the entire contents of the reservoir would slowly drain through the leak.

To remedy all three of these defects I may employ the simple unit shown at A which unit may be readily applied at any suitable place in the pipe line and at any desired level above or below the pump outlet but preferably near the pump. It is illustratively shown, applied in front of the dashboard below the reservoir.

The unit disclosed comprises an inverted metal cup 45 determining a circular air separating or settling chamber 46. Into the lower or open end of the cup 45 is threaded a closure plug 47. A filter disk 48 of dense felt and a gasket 49 are laid upon an inner peripheral ledge 50 in the cup and the rim of plug 47 when applied tightly compresses the rim of the filter in position, as shown, to form the floor of the settling chamber. To prevent sagging of the filter and possible rupture thereof without, however, markedly diminishing the filtering area thereof, I have provided a corrugated perforate metal backing 51 for the filter, said backing resting upon a corresponding flat face 52 in the plug 47.

The filter can be readily recovered and replaced by a fresh one when clogged. The specific arrangement of filter is not claimed herein per se. It is more fully described and claimed in the copending application of Edward H. Kocher, Serial No. 93,582 filed March 10, 1926.

The plug 47 has a nipple 53 within which is disposed a disk valve 54 urged upward against its seat 55 by a coil compression spring 56 retained in place within the nipple by a press-fitted open cup 57. A cap 58 threaded upon the nipple has a nipple 59 affording a terminal to which the inlet end 60 of the main length of piping system 31 may be secured by an appropriate coupling 61.

Oil is admitted to the settling chamber through a pipe 62 connected at its inlet to nipple 30 and at its outlet to a nipple 63 which is threaded into the lateral wall of settling chamber 46 near to upper end thereof. The unit is provided with selective means functioning automatically to vent or reject air and to resist or sustain pressure exerted through lubricant. My air rejecting vent is preferably applied at the upper end of the settling chamber, and is shown as a drip plug 64 similar to that at 40 but devoid of the relief valve for which is substituted a felt plug 65 similar to the plug 38' at the opposite end of the drip plug. The restriction pin 40' fits with minute clearance in the corresponding bore between the strainer plugs 38' and 65. The drip plug vent is threaded at one end into a corresponding socket in the middle of the settling chamber ceiling which is arched at 46'. A pipe 66 connected to the upper or outer end of the vent plug affords a passage therefrom preferably through a nipple 67 threaded into the reservoir bottom 12.

With the system installed as shown in the drawings and the reservoir filled, oil will normally fill the settling chamber 46 through the pipe 62. The valve 54 will, however, prevent the possibility of oil leaking from the settling chamber to the pipe line therebeyond. In operation the pump will draw its charge through port 29 past the open valve 26 from the reservoir. In the subsequent discharge stroke, valve 26 will seat and the pump will emit and transmit pressure through port 29, nipple 30 and pipe 62 to the settling chamber 46. Due to the pump pressure, valve 54 and the various drip plug valves 35, will crack open from their seats, and oil will advance slowly past filter 48, pushing ahead the oil in the pipe line 31 for emission, occurring through the various drip pugs 34 and 41 to the bearings. The specific mode of operation of the drip plugs need not here be set forth at greater length as it constitutes more especially the subject matter of my copending applications Serial No. 124,566 filed July 24, 1926 and Serial No. 126,115 filed July 31, 1926.

The air rejecting vent plug 64 being itself a drip plug will offer the same order of resistance to lubricant flow as do the drip plugs near the bearings, so that pressure is sustained in the settling chamber 46 and the operation of feeding lubricant continues until the pump end 21' has returned to closed or seated position as shown in Fig. 1. The lubricant emitted from the venting plug 64 will return by way of pipe 66 to the reservoir and will accordingly not become lost.

Should the reservoir become depleted of oil or nearly depleted so that air enters the chamber below check valve 26 and is drawn into the pump, the seating of the check valve in the return stroke would prevent return of air which would accordingly be forced into the pipe line 31, in the discharge of the pump. In subsequent pump operations with or without oil such air could be advanced through the nipple 63 into the chamber 46 from which it would escape readily along the arched ceiling 46' of the chamber to and through the venting plug 64 and thence by way of pipe 66 back to the reservoir where it is vented at 18. After the reservoir has been replenished with oil, and all air previously injected by the pump has been passed out of venting plug 64, the normal operation previously described will proceed.

The strainer wads 38' and 65 at the ends of the venting plug not only maintain the restriction pin 40' in place, but serve to exclude foreign particles in the handling of the plug prior to installation thereof. The strainer wads will also aid in intercepting solid particles from any small quantities of oil that may be admitted to the settling chamber through pipe 66.

The pipes being of diameter so small that oil cannot flow about any air therein, it is apparent, that the system can be originally charged with oil, by successive operations of the pump, the oil forced thereby into the pipe line advancing the air ahead of it, and ejecting it through the drip plugs.

The pump exerting a straight downward suction upon the lubricant thereabove through the small valve seat part, the oil immediately thereabove would tend to cavitate, and the pump might accordingly draw air from above even a substantial level of lubricant. While any air would be effectively vented at the settling chamber 46 without deranging the piping system therebeyond, the pump would draw only a partial charge of oil, though a residue of several complete pump charges were still available in the reservoir.

I effectively hinder cavitation, by a plate of larger diameter than the valve disposed transversely across the valve port 28, illustratively in fixed position within the reservoir. Specifically I have provided a disk 70 with three or more outstanding tongues 71 bent downward and outward to form feet 72 screwed at 74 upon a corresponding flat surface 73 about and above the valve cage.

With such plate, direct suction cannot be applied downward from above the valve but the oil must be drawn in laterally from about the periphery of the plate 70, whereby it will be apparent that the suction upon the lubricant is more widely distributed and cavitation is effectively hindered.

The broader claims to the cavitation hindering means are presented in my copending application Serial No. 132,141 filed August 28th, 1926.

While I have shown my invention embodied in a system provided with drip plug metering outlets, and the invention finds a preferred field of application in such relation, it will be understood that the air rejecting instrumentality could be employed to advantage in a distributing system having pressure responsive flow control instrumentalities of type other than drip plugs.

While I have shown a manually operated spring discharged plunger pump with a tight-fitting piston, it will be understood that the air rejecting feature of the invention may be embodied in a system including a pump of any of the more efficient types that do not allow oil, and therefor, of course, air to escape about the operating piston, vane, impeller or ejector.

It will be understood that the air ejecting unit shown at A need not within the scope of the invention claimed herein, be combined with the filter or the relief valve. These elements may be associated with the pump and reservoir installation if desired, as for instance in my copending application Serial No. 662,195 filed September 12, 1923.

I claim:—

1. A central lubricating installation comprising a pressure pump adapted to intermittently feed small charges of oil, a pipe line supplied therefrom and having a plurality of outlet branches leading to the various bearings, metering fittings at said various branches, each of said fittings including a relief valve normally seated to maintain the pipe system filled with oil, and an automatic selective device in the course of flow from the pump to the bearings and affording normally a relatively free passage for venting any air from the part of the system subjected to pump pressure, and reacting to lubricant, by virtue of the viscosity thereof, to sustain pressure transmitted through the lubricant, whereby any air entering the part of the system subjected to pump pressure will be afforded a ready escape from near the pump, and the pressure from the pump will in all operations be transmitted through an incompressible column of lubricant to the various metering fittings.

2. A central lubricating installation comprising a pressure pump adapted to intermittently feed small charges of oil, a pipe line supplied therefrom and having a bore of diameter so small as to preclude the flow of oil around any air therein, said pipe line including a plurality of branches tapped at various parts of the main length thereof, metering restrictions at the outlets of said branches, relief valves normally seated to maintain the pipe system filled with oil, an automatic selective device near the head of the pipe line affording normally a relatively free passage for venting any air from the part of the system subjected to pump pressure and reacting to lubricant by virtue of the viscosity thereof to sustain pressure transmitted to the lubricant, whereby any air entering the part of the system subjected to pump pressure will be afforded a ready escape from near the pump and whereby air present in the pipe line at the outset is pushed through the outlets by the oil admitted from the pump.

3. A central lubricating installation including the combination of a pipe system, a lubricant reservoir, a cylinder, an intermittently operated tight-fitting plunger therein for forcing lubricant from said reservoir into said pipe system, flow controlling means in the branches of said system to the various bearings, predetermining the relative discharge of lubricant therethrough when pressure is applied to the system, said installation having means to prevent leak of lubricant from the filled line after the pressure source has ceased operating, and automatic means near the cylinder to prevent the introduction of air into the pipe line beyond said means upon operation with the reservoir nearly empty.

4. A safeguard unit for a central pressure lubricating system, said unit including a substantially closed settling chamber having an inlet for connection with the pressure source, an outlet for connection with the branched part of the piping system, a selective device in the top of said chamber permitting the venting of air therefrom and resisting the escape of lubricant therethrough, said unit including a filter pad in the path of lubricant flow from the settling chamber thereof.

5. A safeguarding unit for a central pressure lubricating system, said unit including a substantially closed chamber having an inlet for connection with a source of pressure and an outlet for connection to a branched piping system leading to the bearings to be lubricated, said chamber having a minute open air vent through the wall thereof resisting the escape of lubricant therethrough, the chamber being conformed relative to said vent to cause any air forced into the chamber to readily reach such vent, said unit including a filter disk near the outlet, of diameter materially larger than said outlet.

6. A safeguarding unit for a central pressure lubricating system, said unit including a substantially closed settling chamber having an inlet for connection with the pressure source, an outlet for connection to the branched part of the piping system, a selective device in the top of said settling chamber permitting the venting of air therefrom and resisting the escape of lubricant therethrough, and a spring seated relief valve at the outlet of said unit to prevent draining of lubricant therefrom in the intervals between pressure operations.

7. A safeguarding unit for a central pressure system, said unit including a substantially closed chamber having an inlet for connection with a source of pressure and an outlet for connection to a branched piping system leading to the bearings to be lubricated, said chamber having a minute open air vent through the wall thereof resisting the escape of lubricant therethrough, the chamber being conformed relative to said vent to cause any air forced into the chamber to readily reach said vent, and a spring seated relief valve at the outlet of said unit normally closed to prevent the draining of lubricant therefrom into the piping system therebeyond.

8. A safeguarding unit for a central pressure lubricating system, said unit including a substantially closed settling chamber having an inlet for connection with the pump, an outlet for connection to the branched part of the piping system, a selective device in the top of said chamber permitting the venting of air therefrom and resisting the escape of lubricant therethrough, said unit including a filter pad in the path of lubricant flow from the settling chamber, and a spring seated relief valve at the outlet of said unit to prevent draining of lubricant therefrom in the intervals between pressure operations.

9. An air rejecting unit for a central pressure chassis lubricating system comprising a substantially closed casing having an inlet near the ceiling thereof, an outlet through the floor thereof, a minute vent through the top thereof, and means comprising a wad of felt guarding the vent to exclude foreign particles, without interfering with the efficacy of air venting therethrough.

10. A safeguarding unit for a central pressure lubricating system, said unit comprising a substantially closed cylindrical casing having an inlet nipple near the ceiling thereof and an outlet nipple at the floor thereof, a vent plug fixed centrally in the top of said unit, said plug having a minute aperture therethrough the ceiling of said chamber being arched upward with its highest part at said plug, a filter disk at the lower end of said chamber above said outlet nipple, and a relief valve below said filter disk normally spring seated to prevent the escape of lubricant from the unit.

11. A safeguarding unit for a central pressure lubricating system comprising an inverted metal cup, a plug threaded into the open bottom thereof, a ledge within said cup, a filter disk peripherally clamped by said plug against said ledge, an inlet nipple for connection to a source of pressure, threaded into said cup near the ceiling thereof and an outlet nipple disposed below said filter for connection to a branched piping system.

12. A safeguarding unit for a central pressure lubricating system comprising an inverted metal cup, a plug threaded into the open bottom thereof, a ledge within said cup, a filter disk peripherally clamped by said plug against said ledge, an inlet nipple for connection to a source of pressure, and threaded into said cup near the ceiling thereof, an outlet nipple disposed below said filter for connection to a branched piping system, and a spring seated relief valve within said outlet nipple.

13. A supply installation for a central pressure lubricating system, said installation including a reservoir, a pump having a suction operating member drawing from the lower end of said reservoir, a check valve to prevent return flow of lubricant to said reservoir in the discharge of the pump, said installation having a port through which the pump draws its charge from the reservoir, and a plate fixed near said port and extending peripherally therebeyond to compel a lateral course thereabout for the drawing of lubricant, thereby hindering cavitation.

14. A supply installation for a central pressure lubricating system, said installation comprising a reservoir having a well therebelow, a pump provided with a suction piston and connected to draw its charge from said well, a check valve within said well having its seat thereabove, and a plate of diameter larger than said seat supported in fixed position above said well horizontally across the upper end thereof and compelling passage of lubricant due to the suction of the pump only by lateral flow peripherally about the plate, thereby hindering cavitation.

15. A liquid conveying installation comprising a piping system, a pressure pump for intermittently feeding small charges of lubricant into the system, said system having branches with metering outlets, which are connected thereby in pressure transmitting communication with each other throughout emission from the outlets, said system being constructed and arranged to be maintained substantially filled with liquid during the intervals between pressure operations, and means in advance of said branches subjected to pressure applied at said pump to automatically and selectively vent any air advanced thereto in the pump discharge operation and to sustain pressure transmitted from the pump.

16. A central lubricating installation comprising an intermittently operated pressure pump of small volume, a pipe line supplied therefrom and having a plurality of outlet branches leading to various bearings, metering fittings in said various branches, relief valves normally seated to maintain the pipe system filled with oil, and a selective device near the head of the pipe line affording normally a relatively free passage for venting any air from the part of the system subjected to pump pressure, and reacting to lubricant, by virtue of the viscosity thereof, to sustain pressure transmitted through the lubricant, whereby any air entering the part of the system subjected to pump pressure will be afforded a ready escape from near the pump, and the pressure from the pump will in all operations be transmitted through an incompressible column of lubricant to the various metering fittings.

17. A central lubricating installation comprising a pressure pump, a pipe line supplied therefrom and having a bore of diameter so small as to preclude the flow of oil around any air therein, said pipe line including a plurality of branches tapped at various parts of the main length thereof, metering restrictions at the outlets of said branches, relief valves normally seated to maintain the pipe system filled with oil, a selective device near the head of the pipe line affording normally a relatively free passage for venting any air from the part of the system subjected to pump pressure and reacting to lubricant by virtue of the viscosity thereof to sustain pressure transmitted to the lubricant, whereby any air entering the part of the system subjected to pump pressure will be afforded a ready escape from near the pump and whereby air present in the pipe line at the outset is pushed through the outlets by the oil admitted from the pump.

18. A central lubricating installation comprising a reservoir, a single cylinder pump, a piston therein, a spring urging said piston to an end of its stroke, a pipe line supplied from said pump, and having a plurality of outlet branches leading to the various bearings, fittings at said various branches, and actuated to emit when pressure is applied to the pipe line, and means to close off the pipe system and maintain it filled with lubricant during the intervals between pump operations, a check valve controlling the flow of lubricant from the reservoir to the pump and urged to its seat by the pressure discharge of the pump to sustain pressure for propulsion of lubricant through the pipe line, and automatic means operative when the level of lubricant in the reservoir is low to prevent compression of air into the pipe line throughout the operation of the pump.

19. A central lubricating installation comprising a reservoir, a pressure pump having a cylinder of small volume and an intermittently actuated reciprocating piston, propulsive means automatically urging the piston to an end of its stroke, a pipe line supplied from said pump and having a plurality of outlet branches leading to the various bearings, metering fittings at said bearings including relief valves normally seated to maintain the pipe system filled with oil, a check valve controlling the flow of lubricant from the reservoir to the pump and urged to its seat by the pressure discharge of the pump to sustain pressure for propulsion of lubricant through the pipe line and automatic means operative when the level of oil in the reservoir is low to prevent compression of air into the pipe line throughout the operation of the pump.

Signed at New York in the county of New York and State of New York this 25th day of August, A. D. 1926.

JOSEPH BIJUR.